US012683986B2

(12) United States Patent
Shah et al.

(10) Patent No.: US 12,683,986 B2
(45) Date of Patent: Jul. 14, 2026

(54) SYSTEMS AND METHODS FOR PROCESSING ELECTRONIC COMMUNICATIONS

(71) Applicant: Sophos Limited, Abingdon (GB)

(72) Inventors: NarendraKumar Shah, Ahmedabad (IN); Deepak Kharpuriya, Ahmedabad (IN); John Mears, Oxfordshire (GB)

(73) Assignee: Sophos Limited (GB)

( * ) Notice: Subject to any disclaimer, the term of this patent is extended or adjusted under 35 U.S.C. 154(b) by 213 days.

(21) Appl. No.: 18/236,441

(22) Filed: Aug. 22, 2023

(65) Prior Publication Data

US 2025/0071124 A1     Feb. 27, 2025

(51) Int. Cl.
*H04L 9/40*        (2022.01)
*H04L 51/214*      (2022.01)

(52) U.S. Cl.
CPC ........ *H04L 63/1416* (2013.01); *H04L 51/214* (2022.05)

(58) Field of Classification Search
CPC ... H04L 63/1416; H04L 51/214; H04L 63/14; H04L 51/212; H04L 29/06; H04L 29/12; H04L 9/32; H04L 9/40; H04L 9/0827; H04L 51/18; H04L 67/02; H04L 67/563; H04L 63/1441; H04L 63/428; H04L 9/3228; G06F 16/9535; G06F 21/57; G06F 21/62; G06F 21/77; G06F 16/955
USPC ......................................................... 726/23
See application file for complete search history.

(56) References Cited

U.S. PATENT DOCUMENTS

| | | | | |
|---|---|---|---|---|
| 6,957,224 B1 * | 10/2005 | Megiddo | ............... | G06F 16/955 |
| | | | | 707/999.102 |
| 7,228,334 B1 * | 6/2007 | Jordan, Jr. | ............ | H04L 51/234 |
| | | | | 709/224 |
| 8,381,276 B2 * | 2/2013 | Costinsky | ............... | H04L 67/02 |
| | | | | 726/6 |
| 9,129,030 B2 * | 9/2015 | Bedingfield, Sr | .... | H04L 61/301 |
| 9,325,727 B1 * | 4/2016 | Emigh | ................ | H04L 63/0823 |
| 9,411,900 B2 * | 8/2016 | Vishria | ............... | G06F 16/9566 |
| 10,057,207 B2 * | 8/2018 | Kaliski, Jr. | .......... | G06F 16/245 |
| 2006/0069787 A1 * | 3/2006 | Sinclair | ................. | G06F 16/958 |
| | | | | 707/E17.107 |
| 2007/0136279 A1 * | 6/2007 | Zhou | ................... | G06F 16/9566 |
| | | | | 707/E17.115 |

(Continued)

*Primary Examiner* — Sargon N Nano
(74) *Attorney, Agent, or Firm* — Danielson Legal LLC

(57)          ABSTRACT

Systems and methods for processing an electronic communication. The method may include receiving an electronic message including a first location indicator of a network resource, wherein the first location indicator has a first length and includes an identifier of a recipient of the electronic message, wherein the identifier indicates an action allowed to be performed by the recipient, and transforming the first location indicator into a second location indicator of the network resource, wherein the second location indicator has a second length that is less than the first length. The method may further include storing the first location indicator in a network accessible storage location and forwarding the second location indicator of the resource to a recipient to allow the recipient to automatically access the network resource and perform the allowed action upon providing an input with respect to the second location indicator.

19 Claims, 6 Drawing Sheets

(56)          References Cited

U.S. PATENT DOCUMENTS

| | | | |
|---|---|---|---|
| 2010/0257352 A1* | 10/2010 | Errico ................ H04L 63/0861<br>380/283 |
| 2011/0264992 A1* | 10/2011 | Vishria .............. G06F 16/9566<br>715/208 |
| 2011/0289434 A1* | 11/2011 | Kieft ....................... H04L 67/02<br>726/23 |
| 2012/0047577 A1* | 2/2012 | Costinsky .......... G06F 16/9566<br>709/221 |
| 2013/0104038 A1* | 4/2013 | Galper ............... G06F 16/9566<br>715/271 |
| 2016/0248837 A1* | 8/2016 | Cai ......................... H04L 67/55 |
| 2016/0308936 A1* | 10/2016 | Yuan ...................... H04L 67/02 |
| 2018/0011942 A1* | 1/2018 | Zaretsky ........... G06Q 30/0277 |
| 2018/0248964 A1* | 8/2018 | Wei ........................ H04L 67/56 |
| 2018/0307774 A1* | 10/2018 | Zhou ......................... H04L 9/40 |
| 2020/0145396 A1* | 5/2020 | Kondapavuluri ..... H04W 12/04 |
| 2021/0406445 A1* | 12/2021 | Antonio ............. G06F 16/9558 |
| 2022/0086133 A1* | 3/2022 | Killoran, Jr. ........ H04L 63/0807 |
| 2022/0141667 A1* | 5/2022 | Lee ...................... H04L 51/212<br>726/24 |
| 2023/0252149 A1* | 8/2023 | Jain ...................... G06F 21/566<br>713/168 |
| 2024/0411882 A1* | 12/2024 | Plate .................... G06F 21/566 |

* cited by examiner

400 https://eu-west-1.protection.sophos.com/?d=amazon.in&b=4410c5cd-0c1c-4186-91fe-b7f8d73fc77a&x=c517464c-a1ac-432f-b05e-f8d7a5b91f94&q=4MGz7Q3NfRzKm4Y_UUID-25918ee8b0fb48e2a463f93f314fdf51&i=NWRhODNmMTc4NGQwZTIwYzg2MjU3Yjhm&t=TIJVQWY2VFFEbVNSalpNY24vUDB1TWpZT1hYa1RKOUJzUCt4QWVOWkUwOD0-h-f351cb1e92494af2b0d9825d0e3ea789

*FIG. 4*

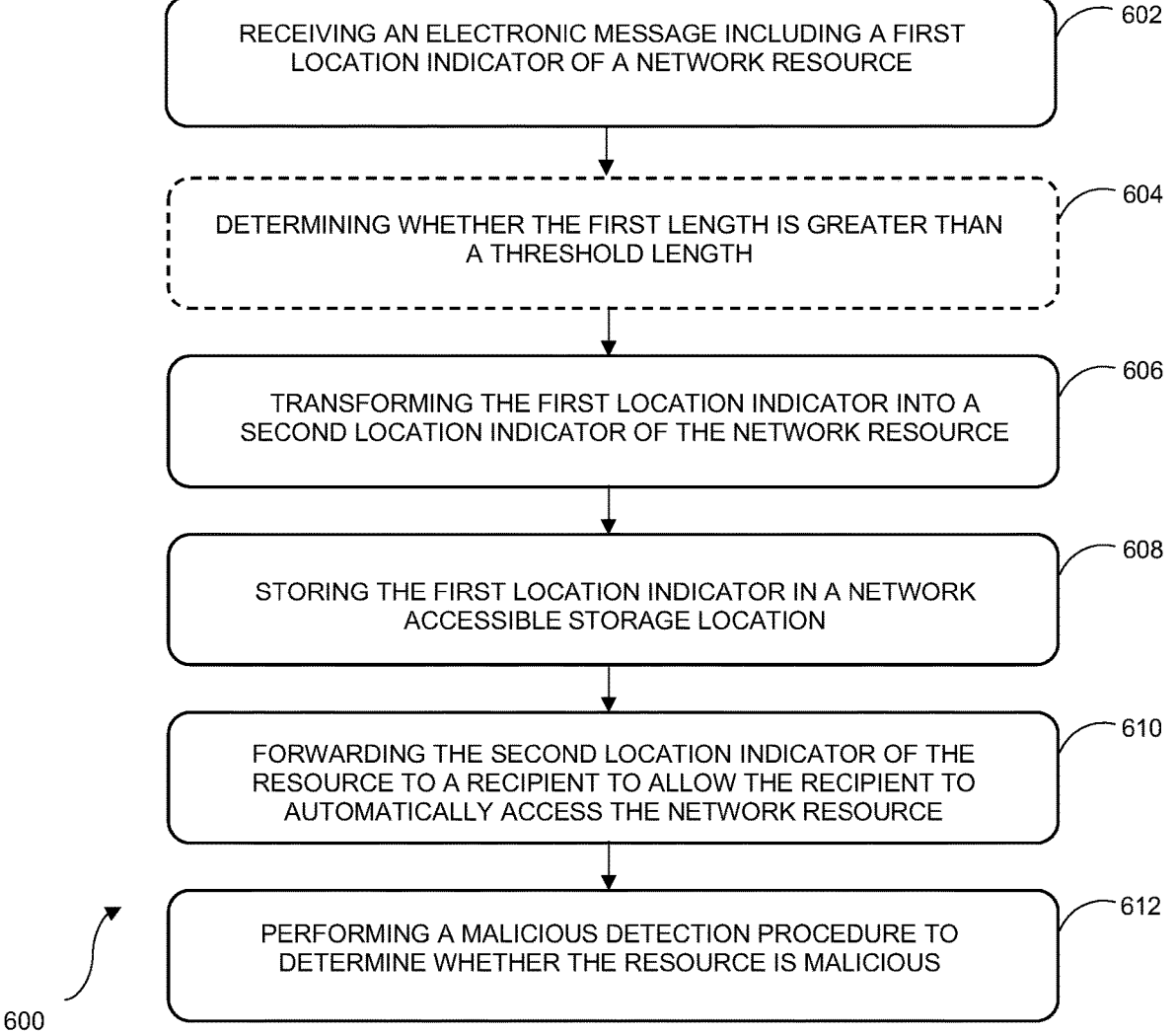

RECEIVING AN ELECTRONIC MESSAGE INCLUDING A FIRST LOCATION INDICATOR OF A NETWORK RESOURCE                     602

DETERMINING WHETHER THE FIRST LENGTH IS GREATER THAN A THRESHOLD LENGTH                     604

TRANSFORMING THE FIRST LOCATION INDICATOR INTO A SECOND LOCATION INDICATOR OF THE NETWORK RESOURCE                     606

STORING THE FIRST LOCATION INDICATOR IN A NETWORK ACCESSIBLE STORAGE LOCATION                     608

FORWARDING THE SECOND LOCATION INDICATOR OF THE RESOURCE TO A RECIPIENT TO ALLOW THE RECIPIENT TO AUTOMATICALLY ACCESS THE NETWORK RESOURCE                     610

PERFORMING A MALICIOUS DETECTION PROCEDURE TO DETERMINE WHETHER THE RESOURCE IS MALICIOUS                     612

SYSTEMS AND METHODS FOR PROCESSING ELECTRONIC COMMUNICATIONS

TECHNICAL FIELD

The present application relates generally to systems and methods for processing electronic communications and, more particularly but not exclusively, to systems and methods for processing electronic communications that include network resource location indicators.

BACKGROUND

Network resources may provide electronic messaging products and security services for these products. These products may enable parties to transmit and receive communications over a network. In operation, a sender may transmit an electronic message such as an electronic mail ("email") to a recipient, and the message may include one or more uniform resource locators (URLs), uniform resource identifiers (URIs), or the like (for simplicity, "URL").

Electronic messaging products are often unable to transmit lengthy URLs, however. Additionally, a single email often includes multiple URLs. Accordingly, it can be difficult for messaging products to communicate electronic messages with lengthy or multiple URLs.

A need exists, therefore, for systems and methods that overcome the disadvantages of existing messaging products.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

The embodiments herein provide systems and methods to process electronic communications with lengthy URLs. An electronic messaging system may receive an email intended for one or more recipients. The message may include a first location indicator (i.e., a first URL) of a network resource. The first location indicator may have a first length defined by the number of characters therein, and may also include an identifier of a recipient of the message.

The system may first determine the length of the first URL. If the length is above some threshold, the system may transform the first URL into a second URL. The second URL may have a second length that is less than or otherwise shorter than the first length.

The system may associate the first location indicator and the second location indicator with a shared token value. Once this association is made, the first URL may be stored in a cloud accessible storage, and the second URL may be communicated to the recipient.

This allows the recipient to access the first URL, and therefore the network resource, upon providing an input with respect to the second URL. For example, the recipient may click on the second URL in the received email. Additionally, the electronic message may include an identifier of the recipient that indicates an action allowed to be performed by the recipient. The system may also perform any required security checks, such as to determine whether the network resource is malicious.

BRIEF DESCRIPTION OF DRAWINGS

Non-limiting and non-exhaustive embodiments of the invention are described with reference to the following figures, wherein like reference numerals refer to like parts throughout the various views unless otherwise specified.

FIG. 4 presents a URL in accordance with one embodiment;

FIG. 6 depicts a flowchart of a method for processing an electronic communication in accordance with one embodiment.

DETAILED DESCRIPTION

Figure 1:
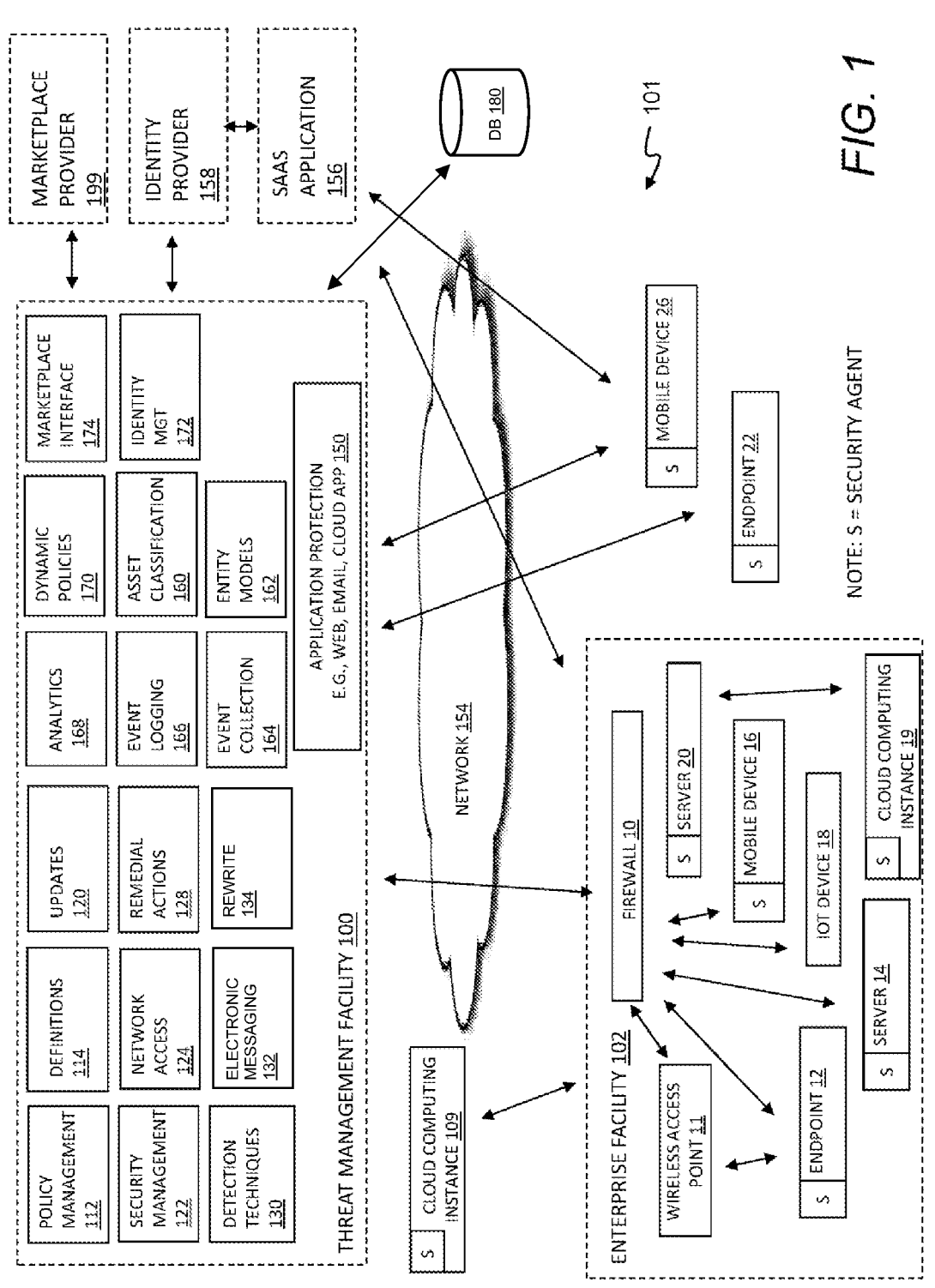
FIG. 1 illustrates a threat management system in accordance with one embodiment.

Various embodiments are described more fully below with reference to the accompanying drawings, which form a part hereof, and which show specific embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

FIG. 1 illustrates a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the threat management system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

The threat management facility 100 may execute one or more modules or facilities to analyze files that have been requested for download by a user device. For example, the threat management facility 100 may be tasked with monitoring and ensuring the security of devices on an enterprise facility 102. Upon a device on the enterprise facility 102 requesting to download a file, the threat management facility 100 or components thereof may analyze the file to determine whether the device is permitted to download the file.

As one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, the enterprise facility 102 may be or may include any networked computer-based infrastructure. For example, the enterprise facility 102 may be corporate, commercial, organizational, educational, governmental, or the like. As home networks become more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is by way of example, and it will be understood that there may be any number of compute instances, less or more of each type of compute instances, and other types of compute instances. As shown, the enterprise facility includes a firewall 10, a wireless access point 11, an endpoint 12, a server 14, a mobile device 16, an appliance or Internet-of-Things (IOT) device 18, a cloud computing instance 19, and a server 20. Again, the compute instances 10-20 depicted are by way of example, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access facility 124, remedial action facility 128, detection techniques facility 130, an electronic messaging service 132, a rewrite service 134, application protection 150, asset classification facility 160, entity model facility 162, event collection facility 164, event logging facility 166, analytics facility 168, dynamic policies facility 170, identity management facility 172, and marketplace interface facility 174, as well as other facilities. For example, there may be a testing facility, a threat research facility, and other facilities (not shown). It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility 102. Some or all of one or more of the facilities 100, 112-174 may be provided on the same physical hardware or logical resource as a gateway, such as a firewall 10, or wireless access point 11. Some or all of one or more of the facilities 100, 112-174 may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider 199 may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider 199 may be a specialized analytics provider; and so on. The marketplace provider 199, with appropriate permissions and authorization, may receive and send events, observations, inferences, controls, convictions, policy violations, or other information to the threat management facility 100. For example, the marketplace provider 199 may subscribe to and receive certain events, and in response, based on the received events and other events available to the marketplace provider 199, send inferences to the marketplace interface facility 174, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider 158 may be any system or entity that creates, maintains, and manages identity information for principals while providing authentication services to relying party applications, e.g., within a federation or distributed network. The identity provider 158 may, for example, offer user authentication as a service, where other applications, such as web applications, outsource the user authentication step(s) to a trusted identity provider.

In embodiments, the identity provider 158 may provide user identity information, such as multi-factor authentication, to a software-as-a-service (SaaS) application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 may inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as a client 22 or other type of computing device outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop or other type of public location. While threats may come from a variety of sources, such as from network threats, physical proximity threats, secondary location threats, the compute instances 10-26 may be protected from threats even when a compute instance 10-26 is not connected to the enterprise facility 102 network, such as when the client 22 or other compute instances 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Examples of commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination thereof.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to the facility 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in a security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, or unwanted applications; help control web browsing; and the like, which may provide comprehensive web access control to enable safe and productive web browsing. Web security and control may provide Internet use policies, reporting on suspect compute instances, security and content filtering, active monitoring of network traffic, Uniform Resource Identifier (URI) filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data is made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Examples of rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. These policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of Universal Serial Bus (USB) disks, and the policy management facility 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access.

The policy management facility 112 may also require update management (e.g., as provided by the update facility 120). Update management for the security management facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security management facility 122 and policy management facility 112 may push information to the enterprise facility 102 network and/or the compute instances 10-26, the enterprise facility 102 network and/or compute instances 10-26 may pull information from the security management facility 122 and policy management facility 112, or there may be a combination of pushing and pulling of information. For example, the enterprise facility 102 network and/or compute instances 10-26 may pull update information from the security management facility 122 and policy management facility 112 via the update facility 120, an update request may be based on a time period, by a certain time, by a date, on demand, or the like. In another example, the security management facility 122 and policy management facility 112 may push the information to the enterprise facility's 102 network and/or compute instances 10-26 by providing notification that there are updates available for download and/or transmitting the information. In an embodiment, the policy management facility 112 and the security management facility 122 may work in concert with the update facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that may be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, defini-
tions, remedial actions, and so on.

The security management facility 122 may scan an out-
going file and verify that the outgoing file is permitted to be
transmitted according to policies. By checking outgoing
files, the security management facility 122 may be able
discover threats that were not detected on one of the com-
pute instances 10-26, or policy violation, such transmittal of
information that should not be communicated unencrypted.

The threat management facility 100 may control access to
the enterprise facility 102 networks. A network access
facility 124 may restrict access to certain applications,
networks, files, printers, servers, databases, and so on. In
addition, the network access facility 124 may restrict user
access under certain conditions, such as the user's location,
usage history, need to know, job position, connection type,
time of day, method of authentication, client-system con-
figuration, or the like. Network access policies may be
provided by the policy management facility 112, and may be
developed by the enterprise facility 102, or pre-packaged by
a supplier. Network access facility 124 may determine if a
given compute instance 10-22 should be granted access to a
requested network location, e.g., inside or outside of the
enterprise facility 102. Network access facility 124 may
determine if a client 22 or compute instance 26 such as a
device outside the enterprise facility 102 may access the
enterprise facility 102. For example, in some cases, the
policies may require that when certain policy violations are
detected, certain network access is denied. The network
access facility 124 may communicate remedial actions that
are necessary or helpful to bring a device back into com-
pliance with policy as described below with respect to the
remedial action facility 128. Aspects of the network access
facility 124 may be provided, for example, in the security
agent of the endpoint 12, in a wireless access point 11, in a
firewall 10, as part of application protection 150 provided by
the cloud, and so on.

In an embodiment, the network access facility 124 may
have access to policies that include one or more of a block
list, a black list, an allowed list, a white list, an unacceptable
network site database, an acceptable network site database,
a network site reputation database, or the like of network
access locations that may or may not be accessed by the
client facility. Additionally, the network access facility 124
may use rule evaluation to parse network access requests
and apply policies. The network access facility 124 may
have a generic set of policies for all compute instances, such
as denying access to certain types of websites, controlling
instant messenger accesses, or the like. Rule evaluation may
include regular expression rule evaluation, or other rule
evaluation method(s) for interpreting the network access
request and comparing the interpretation to established rules
for network access. Classifiers may be used, such as neural
network classifiers or other classifiers that may be trained by
machine learning.

The threat management facility 100 may include an asset
classification facility 160. The asset classification facility
will discover the assets present in the enterprise facility 102.
A compute instance such as any of the compute instances
10-26 described herein may be characterized as a stack of
assets. The one level asset is an item of physical hardware.
The compute instance may be, or may be implemented on
physical hardware, and may have or may not have a hyper-
visor, or may be an asset managed by a hypervisor. The
compute instance may have an operating system (e.g.,
Windows, macOS, OS X, Linux, Android, IOS). The com-
pute instance may have one or more layers of containers.

The compute instance may have one or more applications,
which may be native applications, e.g., for a physical asset
or virtual machine, or running in containers within a com-
puting environment on a physical asset or virtual machine,
and those applications may link libraries or other code or the
like, e.g., for a user interface, cryptography, communica-
tions, device drivers, mathematical or analytical functions
and so forth. The stack may also interact with data. The stack
may also or instead interact with users, and so users may be
considered assets.

The threat management facility 100 may include the
entity model facility 162. The entity models may be used, for
example, to determine the events that are generated by
assets. For example, some operating systems may provide
useful information for detecting or identifying events. For
examples, operating systems may provide process and usage
information that accessed through an application program-
ming interface (API). As another example, it may be pos-
sible to instrument certain containers to monitor the activity
of applications running on them. As another example, entity
models for users may define roles, groups, permitted activi-
ties and other attributes.

The event collection facility 164 may be used to collect
events from any of a wide variety of sensors that may
provide relevant events from an asset, such as sensors on any
of the compute instances 10-26, the application protection
150, a cloud computing instance 109 and so on. The events
that may be collected may be determined by the entity
models. There may be a variety of events collected. Events
may include, for example, events generated by the enterprise
facility 102 or the compute instances 10-26, such as by
monitoring streaming data through a gateway such as fire-
wall 10 and wireless access point 11, monitoring activity of
compute instances, monitoring stored files/data on the com-
pute instances 10-26 such as desktop computers, laptop
computers, other mobile computing devices, and cloud
computing instances 19, 109. Events may range in granu-
larity. One example of an event is the communication of a
specific packet over the network. Another example of an
event may be identification of an application that is com-
municating over a network.

The event logging facility 166 may be used to store events
collected by the event collection facility 164. The event
logging facility 166 may store collected events so they may
be accessed and analyzed by the analytics facility 168. Some
events may be collected locally, and some events may be
communicated to an event store in a central location or cloud
facility. Events may be logged in any suitable format.

Events collected by the event logging facility 166 may be
used by the analytics facility 168 to make inferences and
observations about the events. These observations and infer-
ences may be used as part of policies enforced by the
security management facility Observations or inferences
about events may also be logged by the event logging
facility 166.

When a threat or other policy violation is detected by the
security management facility 122, the remedial action facil-
ity 128 may remediate the threat. Remedial action may take
a variety of forms, non-limiting examples including collect-
ing additional data about the threat, terminating or modify-
ing an ongoing process or interaction, sending a warning to
a user or administrator, downloading a data file with com-
mands, definitions, instructions, or the like to remediate the
threat, requesting additional information from the requesting
device, such as the application that initiated the activity of
interest, executing a program or application to remediate
against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 128 may take any steps or deploy any measures suitable for addressing a detection of a threat, potential threat, policy violation or other event, code or activity that might compromise security of a computing instance 10-26 or the enterprise facility 102 as identified by one or more of the facilities such as the policy management facility 112, security management facility 122, update facility 120, definitions facility 114, network access facility 124, detection techniques facility 130, an electronic messaging service 132, a rewrite service 134, application protection 150, asset classification facility 160, entity model facility 162, event collection facility 164, event logging facility 166, analytics facility 168, dynamic policies facility 170, and an identity management facility 172, marketplace interface facility 174.

Figure 2:
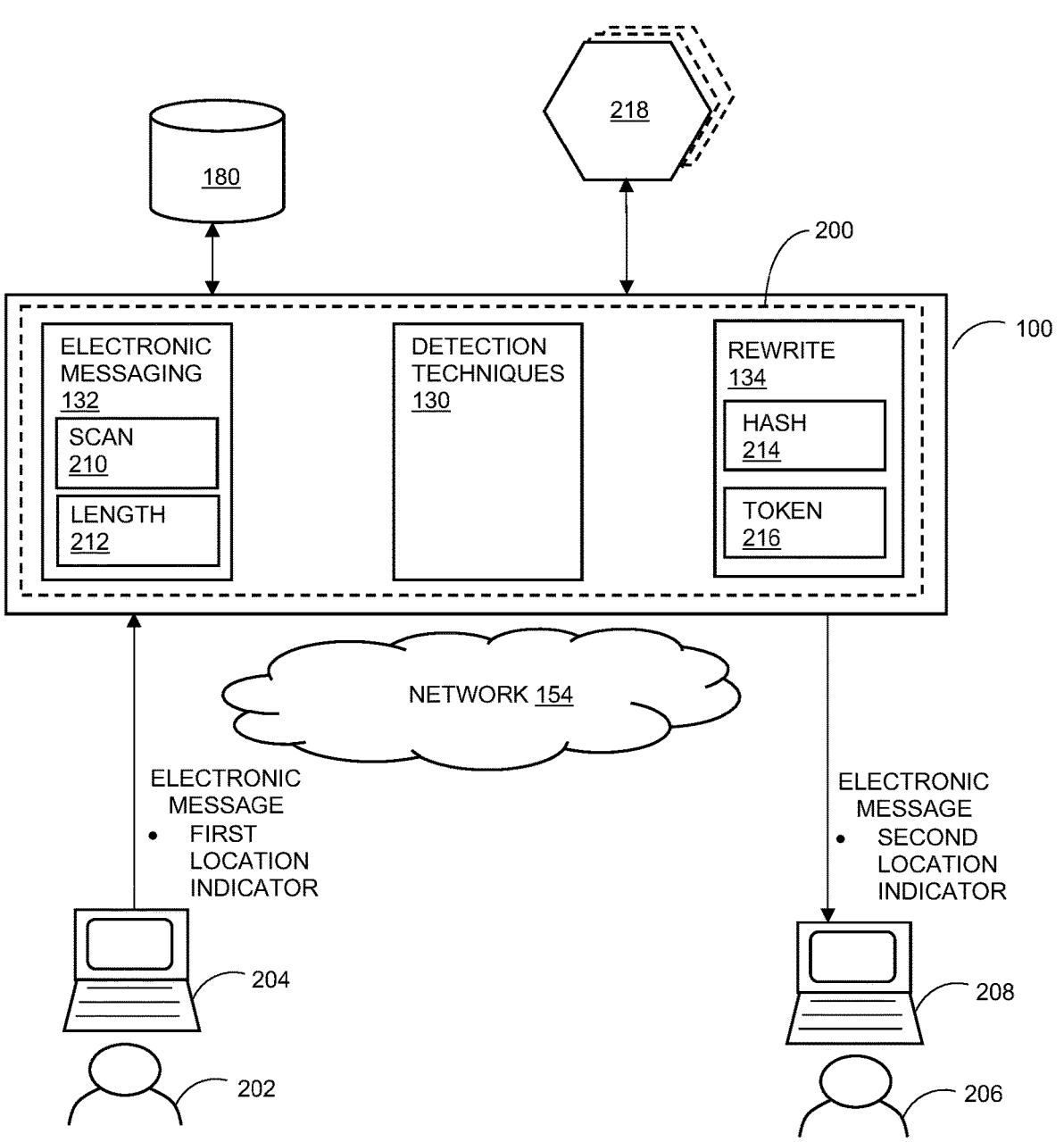
FIG. 2 illustrates a system for processing an electronic communication in accordance with one embodiment.

FIG. 2 illustrates a system 200 for processing an electronic message in accordance with one embodiment. The system 200 may include various components or services of the threat management facility 100 of FIG. 1, such as the electronic messaging service 132, the detection techniques facility 130, and the rewrite service 134. These services and components may be instantiated by the threat management facility 100 of FIG. 1, or may be instantiated by another network resource at another location.

A first user 202 may use a first client 204 to communicate an electronic message to a second user 206 using a second client 208. Each of the first client 204 and the second client 208 may execute an application that allows the respective users 202 and 206 to transmit and receive electronic messages over the network 154. The first user 202 may provide one or more resource location indicators (e.g., URLs) in their electronic message. For example, the electronic message may include marketing material advertising products or services, and may include URLs directing a viewer to such products or services.

Figure 3:
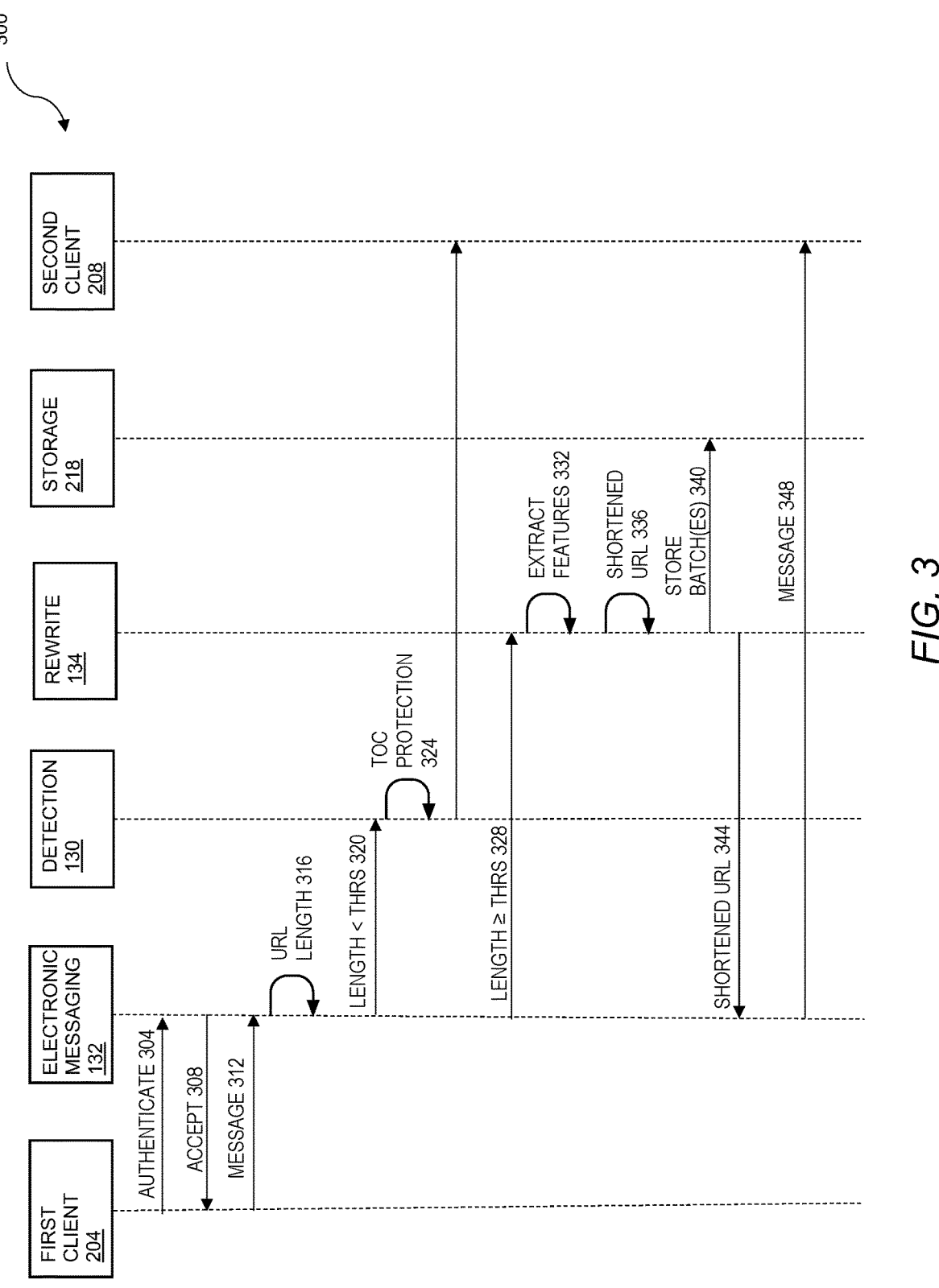
FIG. 3 depicts a message sequence diagram involving the components of FIG. 2 in accordance with one embodiment.

FIG. 3 depicts a message sequence diagram 300 that describes the electronic communication process between the first client 204 and the second client 208 in accordance with one embodiment. To transmit an electronic message, the user of the first client 204 may first provide any required credentials. For example, the user may need to authenticate with the system 200 by providing, e.g., a username, password, two-factor authentication information, a hardware-based personal identification number (PIN), etc. (Step 304)

Once the electronic messaging service 132 accepts the authentication credentials and authenticates the first client 204 (Step 308), the first client 204 may transmit the electronic message (e.g., an email) intended for the second user 206 and accessible on the second client 208. In other words, the electronic messaging service 132 may act as an intermediary and receive the electronic message before it is transmitted to the second client 208. (Step 312)

The electronic messaging service 132 may execute a scanning service 210 to first identify whether the electronic message includes any URLs. For example, the scanning service 210 may be a background service that, upon receipt of an electronic message, executes a string-matching procedure to detect strings that are common in URLs (e.g., domain names, suffixes, extensions, schemes, protocols, etc.). The scanning service 210 may be instantiated as a separate service or may be instantiated as part of another service or module.

If the scanning service 210 detects a URL in the electronic message, a length detection service 212 may then determine the number of characters in the URL(s) in the electronic message (Step 316). The length detection service 212 may be a background service that, upon receipt of the URL, executes a character counting procedure to determine the number of characters in the URL.

The electronic messaging service 132 may compare the URLs and, specifically, the number of characters in the URLs, to some threshold amount (Step 320). The threshold amount may be set by an administrator, for example. In some embodiments, the threshold amount may be 1,500 characters, such that URLs with more than 1,500 characters are selected for rewriting.

In some embodiments, an administrator may define certain parameters such as the threshold amount via a feature flag. A feature flag may refer to an application programming interface (API) that allows the administrator to configure certain parameters and adjust values for these parameters. In some embodiments, these parameters may be a system-configured parameter.

If the length of URL does not exceed the threshold amount, the electronic messaging service 132 may forward the electronic message, including the URL, to the detection techniques facility 130. The detection techniques facility 130 may perform one or more time-of-click protection procedures to assess the risk associated with the URL (Step 324).

For example, the detection techniques facility 130 may reference one or more databases 180 storing data regarding known URLs. The database(s) 180 may include whitelists of known, benign URLs that do not pose a threat. Similarly, the database(s) 180 may store blacklists of known, malicious or at least potentially malicious URLs that may pose a threat.

The detection techniques facility 130 may compare the URL(s) of the electronic message with one or more stored URLs to determine a risk associated with the URL. Based on the associated risk, the detection techniques facility 130 may block a URL, allow the URL, warn the second client 208 about possible risks associated with the URL and ask for confirmation before allowing the URL, or the like. The warning may indicate that a URL in the electronic message may be associated with malicious activity or is otherwise risky, but may also give the client 208 the option as to whether they click on the URL.

If the electronic messaging service 132 determines the length of the URL equals or exceeds the threshold, the electronic messaging service 132 may transmit the identified URL(s) to the rewrite service 134 (Step 328). The rewrite service 134 may be a background service that, upon receipt of a URL, may extract features from the URL. URLs tend to follow the same formats and include similar information. For example, the rewrite service 134 may extract data regarding the domain associated with the URL, the sender of the electronic message, a unique user identifier (UUID), queue identifier (queue ID), a recipient or user ID, etc.

FIG. 4 presents one example of a portion of a long URL 400 in accordance with one embodiment. A URL may be considerably greater in length with significantly more characters. For example, URLs often have thousands of characters.

The URL 400 may include or otherwise comprise several different features. The rewrite service 134 may first identify and extract certain features (Step 332), such as the following data from the URL 400:

```
d = domain name = amazon.in.
b = batch ID = 4410c5cd-0c1c-4186-91fe-b7f8d73fc77a
x = unique identifier for the URL = c517464c-a1ac-432f-
  b0-5e-f8d7a5b91f94
q = queue ID of the electronic message = 4MGz7Q3NfRzKm4Y
UUID = 25918ee8b0fb48e2a463f93f314fdf51
i = User ID = NWRhoDNmMTc4NGQwZTIwYzg2MjU3Yjhm
```

The rewrite service 134 may also execute a token generation service 216 to generate a token based on the domain, unique identifier of the URL, user ID, queue ID, or some combination thereof. As seen in FIG. 4, the generated token is shown as t=Token key:

TIJVQWY2VFFEbVNSalpNY24vUDB1TWpZT1hYa1RKOUJzUC
t4QWVVOWkUwOD0.

The rewrite service 134 may then generate a shortened URL using the domain, UUID, user ID, and queue ID (Step 336). The shortened URL may be in the following format:

[region].protection.sophos.com/?d-[domain]&h[uuid]
&i=[user-id]&b=[<batch-uuid>]&t[token]

The UUID may also indicate action(s) allowed to be performed by the recipient. For example, the UUID may indicate a recipient's credentials, status or position within a company, authorization level(s), etc. This information may control what resources the recipient is allowed to access. For example, an administrator of a corporate network may define certain policies for different groups or types of employees.

As another example, the UUID may be associated with a recipient who is prone to click on malicious or otherwise unsafe URLs. In these situations, the recipient's past behavior may affect their permitted actions. For example, if the recipient frequently clicks on URLs that are unsafe or otherwise associated with malicious activity, the recipient may be prevented from accessing a URL. Additionally and/or alternatively, the recipient may need to acknowledge the risks associated with clicking a URL before doing so, or may need to undergo a training exercise about safe browsing habits.

The rewrite service 134 may also impose limits on the number of characters in the shortened URL. The rewrite service 134 may require the shortened URL to have an overall length that is less than some length threshold, or require individual features of the shortened URL to have a length that is less than some threshold. In some embodiments, the rewritten, shortened URL may be no more than 500 characters.

As part of the rewriting process, the rewrite service 134 may execute a hash generation service 214 to generate a hash of one or more of the features. For example, the hash generation service 214 may execute a Secure Hash Algorithm (SHA) such as hash functions associated with the SHA-2 and SHA-3 hash function families to calculate a hash pertaining to one or more of the features.

The rewrite service 134 may generate a batch of one or more URLs (depending on how many URLs are in the electronic message) and store the batch(es) in one or more cloud storage devices 218 (Step 340). The storage devices 218 may be cloud storage devices such the AMAZON S3® storage devices by Amazon.com, Inc. headquartered in Seattle, Washington.

In some embodiments, each electronic message may be associated with a particular batch. That is, all URLs of an electronic message may be grouped in the same batch. In some embodiments, if there is only one URL in an electronic message, there may be only one batch associated with the electronic message. In some embodiments, if there are multiple URLs in an electronic message, the electronic message may be associated with more than one batch, such as if the number of URLs exceeds a limit for a single batch.

Accordingly, the rewrite service 134 may generate a batch of URLs and write them to the below path:

bucket-name/<user-id-4-char>/[batch-UUID-long]/
  batch-uuid.json

The batch of URLs may be stored in the cloud storage 218 for later retrieval. The rewrite service 134 may also communicate this network resource locator (for simplicity, "second URL"), including the generated token, to the electronic messaging service 132 (Step 344).

The electronic messaging service 132 may then forward a modified electronic message to the second client 208 (Step 348). The electronic message is "modified" in that it includes the shortened URL.

Figure 5:
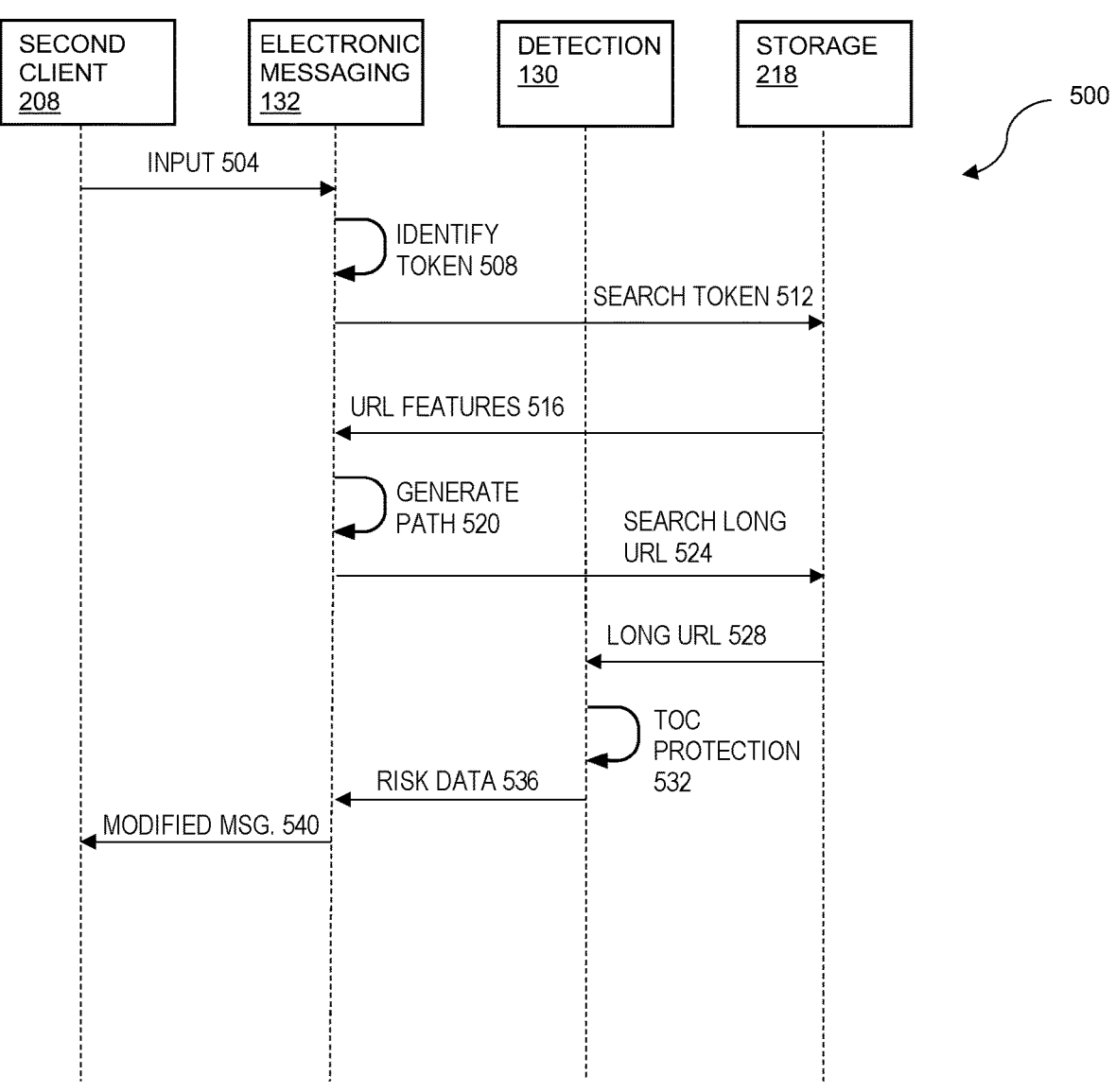
FIG. 5 depicts a message sequence diagram for retrieving a URL in accordance with one embodiment.

FIG. 5 depicts a message sequence diagram 500 for retrieving an original (i.e., long) URL in accordance with one embodiment. The exchanges or actions of the sequence diagram 500 may occur after those of the message sequence diagram 300 of FIG. 3.

After receiving the electronic message, the second client 208 may receive some user input with respect to the second URL (Step 504). For example, the second user 206 may provide an input by clicking on the second URL through an application executing on the second client 208. The second client 208 may communicate data regarding this input to the electronic messaging service 132.

The electronic messaging service 132 may extract or otherwise identify the token value from the shortened URL (Step 508). For example, the scanning service 210 may execute a pattern-matching scanning procedure to search for and identify the token from the shortened URL. For example, the scanning service 210 may identify a character string that follows "t=" as the token.

The electronic messaging service 132 may reference the cloud storage 218 to search for the token (Step 512). If the token is present in the storage 218, the electronic message service 132 determine that the token and the second URL are valid and may also receive data associated with the token (Step 516). For example, the electronic messaging service 132 may also receive the domain and UUID parameters associated with the stored token.

The electronic messaging service 132 may use these parameters to generate a path (Step 520) in the form of:

bucket-name/<4-char-of-hash-of-user-id>/[user-id]/
  [queue-id]/long-urls-data.json The electronic messaging service 132 may then search for the stored, long URL accessible from this path on the cloud storage device 218 (Step 524). If the URL is found in the storage 218, the URL may be forwarded to the detection techniques facility 130 (Step 528).

The detection techniques facility 130 may then perform any appropriate, time-of-click analysis procedures (Step 532). For example, and as discussed in conjunction with FIG. 3 for URLs that do not exceed the length threshold, the detection techniques facility 130 may reference one or more databases 180 storing data regarding known URLs. For example, the email messaging service 132 may detect any link-based malware or other type of malicious activity by analyzing the reputation of the URL. The detection techniques facility 130 may communicate any risk data associated with the URL to the electronic messaging service 132 (Step 536).

The detection techniques facility 130 may or may not allow the second client 208 to receive the URL. In some embodiments, the detection techniques facility 130 or some other component or service associated with the threat management facility 100 (e.g., the application protection service 150) may present a warning to the second client 208, and give them the option of clicking the URL when communicating the modified message to the second client 208 (Step 540).

FIG. 6 depicts a flowchart of a method 600 for processing an electronic communication in accordance with one embodiment. The components or services of any one of FIGS. 1-3 and 5 may perform the steps of method 600.

Step 602 involves receiving an electronic message including a first location indicator of a network resource. The first location indicator may have a first length and may include an identifier of a recipient of the electronic message. The identifier may indicate an action allowed to be performed by the recipient.

Step 604 involves determining whether the first length is greater than a threshold length, wherein the first location indicator is transformed based on determining that the first length is greater than the threshold length. For example, the length detection service 212 may execute a counting procedure to determine the length (e.g., the number of characters) of the first location indicator.

In some embodiments, an administrator or other interested party may define the threshold. In some embodiments, the threshold may be based on the capabilities of the electronic messaging service.

Step 606 involves transforming the first location indicator into a second location indicator, wherein the second location indicator has a second length that is less than the first length. The rewrite service 134 may perform step 606. A discussed previously, in some embodiments the hash generation service 214 may execute a hash procedure to transform one or more features into a hashed value. The rewrite service 134 may then generate a path based on the transformed values, and step 608 involves storing the first location indicator in a network accessible storage 218.

Step 610 involves forwarding the second location indicator of the resource to a recipient 208 to allow the recipient 208 to automatically access the network resource and perform the allowed action upon providing an input with respect to the second location indicator.

Step 612 involves performing a malicious detection procedure to determine whether the resource is malicious. For example, the detection techniques facility 130 may compare the locator associated with the resource to a list of known benign or malicious locators. The electronic messaging service 132 may forward the second location indicator to the recipient based on the resource not being malicious. In some embodiments, the electronic messaging service 132 may prevent the client 208 from receiving the URL, such as if the URL was at least likely associated with malicious activity. In some embodiments, the electronic messaging service 132 may forward the URL to the client 208, but may provide a warning that the URL may be associated with malicious activity or is otherwise risky.

In operation, the recipient 208 may attempt to access the network resource by clicking on the second URL via their electronic messaging service. As discussed previously, the electronic messaging service 132 may then validate a token associated with the second URL by referencing one or more cloud storages 218. If the token is valid (i.e., it is present in the cloud storage(s) 218), the electronic messaging service 132 may also receive other parameters associated with the stored token. Based on these parameters, the electronic messaging service 132 may identify the location of the original, long URL, and redirect the recipient to the original URL.

The described embodiments provide novel techniques for processing electronic communications. The embodiments herein enable electronic messaging services to handle electronic messages that contain lengthy URLs that would otherwise unable to be sent to a recipient.

Existing mail clients cannot handle lengthy URLs, which can cause issues for users when they click on such URLs. For example, most browsers have restrictions on the size of URLs they can service.

Accordingly, the embodiments herein can store lengthy network resource locators such as URLs and associated metadata for a retention period. This allows a modified URL to be sent over a network, and prevents issues that may arise when a user may attempt to access a network resource associated with a long URL. Additionally, the latency associated with retrieving the original, long URL is on the order of only microseconds.

In one aspect, embodiments relate to a method for processing an electronic communication. The method includes receiving an electronic message including a first location indicator of a network resource, wherein the first location indicator has a first length and includes an identifier of a recipient of the electronic message, wherein the identifier indicates an action allowed to be performed by the recipient; transforming the first location indicator into a second location indicator of the network resource, wherein the second location indicator has a second length that is less than the first length; storing the first location indicator in a network accessible storage location; and forwarding the second location indicator of the resource to a recipient to allow the recipient to automatically access the network resource and perform the allowed action upon providing an input with respect to the second location indicator.

In some embodiments, the method further includes determining whether the first length is greater than a threshold length, wherein the first location indicator is transformed based on determining that the first length is greater than the threshold length. In some embodiments, the method further includes specifying the threshold length using a feature flag.

In some embodiments, the second location indicator includes at least one of domain name, a queue identifier, and a user identifier.

In some embodiments, transforming the first location indicator into the second location indicator involves executing a hash procedure on at least a portion of the first location indicator.

In some embodiments, the method further includes associating the first location indicator and the second location indicator with a shared token value. In some embodiments, the method further includes receiving a recipient input with respect to the second location indicator; accessing the first location indicator based on the shared token value; directing the recipient to the network resource via the first location indicator; and enabling the recipient to perform the allowed action.

In some embodiments, the method further includes, based on receiving a recipient interaction, performing a malicious detection procedure to determine whether the resource is malicious, and the second location indicator of the resource is forwarded to the recipient based on the resource not being malicious.

In some embodiments, the second location indicator is forwarded to the recipient via an electronic message.

According to another aspect, embodiments relate to a system for processing an electronic communication. The system includes an interface configured to receive an electronic message including a first location indicator of a network resource, wherein the first location indicator has a first length and includes an identifier of a recipient of the electronic message, wherein the identifier indicates an action allowed to be performed by the recipient; and one or more processors executing instructions stored on memory to transform the first location indicator into a second location indicator of the network resource, wherein the second location indicator has a second length that is less than the first length, and forward the second location indicator of the resource to a recipient to allow the recipient to automatically access the network resource and perform the allowed action upon providing an input with respect to the second location indicator; and a network accessible storage location for storing the first location indicator.

In some embodiments, the one or more processors are further configured to whether the first length is greater than a threshold length, wherein the first location indicator is transformed based on determining that the first length is greater than the threshold length.

In some embodiments, the one or more processors specify the threshold length using a feature flag.

In some embodiments, the second location indicator includes at least one of a domain name, a queue identifier, and a user identifier.

In some embodiments, the one or more processors transform the first location indicator into the second location indicator by executing a hash procedure on at least a portion of the first location indicator.

In some embodiments, the one or more processors are further configured to associate the first location indicator and the second location indicator with a shared token value. In some embodiments, the one or more processors are further configured to, upon receiving a recipient input with respect to the second location indicator: access the first location indicator based on the shared token value, direct the recipient to the network resource via the first location indicator, and enable the recipient to perform the allowed action.

In some embodiments, the one or more processors are further configured to, based on receiving a recipient interaction, perform a malicious detection procedure to determine whether the resource is malicious, and forward the second location indicator of the resource to the recipient based on the resource not being malicious.

In some embodiments, the second location indicator is forwarded to the recipient via an electronic message.

According to yet another aspect, embodiments relate to a computer program product for processing an electronic communication, the computer program product comprising computer executable code embodied in one or more non-transitory computer readable media that, when executing on one or more processors, performs the steps of: receiving an electronic message including a first location indicator of a network resource, wherein the first location indicator has a first length and includes an identifier of a recipient of the electronic message, wherein the identifier indicates an action allowed to be performed by the recipient; transforming the first location indicator into a second location indicator of the network resource, wherein the second location indicator has a second length that is less than the first length; storing the first location indicator in a network accessible storage location; and forwarding the second location indicator of the resource to a recipient to allow the recipient to automatically access the network resource and perform the allowed action upon providing an input with respect to the second location indicator.

In some embodiments, the computer program product further comprises computer executable code that, when executing on one or more processors, performs the step of determining whether the first length is greater than a threshold length wherein the first location indicator is transformed based on determining that the first length is greater than the threshold length.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for processing an electronic communication, the method comprising:

receiving an electronic message including a first location indicator of a network resource, wherein the first location indicator has a first length and includes a user identifier of a recipient of the electronic message, wherein the user identifier indicates an action allowed to be performed by the recipient;

transforming the first location indicator into a second location indicator of the network resource;

storing the first location indicator in a network accessible storage location;

performing a security check on the first location indicator to confirm the first location indicator is not malicious, wherein the security check is performed by analyzing a reputation of the first location indicator;

confirming the recipient can access the network resource; and directing the recipient to the network resource via the first location indicator to allow the recipient to automatically access the network resource and perform the allowed action upon providing an input with respect to the second location indicator, wherein the second location indicator is configured to be non-resolving at a client device and does not identify the network resource, and wherein providing the input with respect to the second location indicator causes a server to retrieve the first location indicator from the network accessible storage location based on the second location indicator, re-perform the security check and confirm the allowed action for the recipient, and enable redirection to the network resource and execution of the allowed action only after successful server side validation.

2. The method of claim 1 further comprising:

determining whether the first length is greater than a threshold length, wherein the first location indicator is transformed based on determining that the first length is greater than the threshold length.

3. The method of claim 2 further comprising specifying the threshold length using a feature flag.

4. The method of claim 2, wherein the threshold length is based on capabilities of an electronic messaging service.

5. The method of claim 1 wherein the second location indicator includes at least one of domain name, a queue identifier, and a user identifier.

6. The method of claim 1 further comprising associating the first location indicator and the second location indicator with a shared token value.

7. The method of claim 1 wherein the second location indicator is forwarded to the recipient via an electronic message.

8. The method of claim 1 wherein the second location indicator is forwarded to the recipient via an electronic message.

9. The method of claim 1 wherein the latency associated directing the recipient to the network resource is on the order of microseconds.

10. A system for processing an electronic communication, the system comprising:

an interface configured to receive an electronic message including a first location indicator of a network resource, wherein the first location indicator has a first length and includes a user identifier of a recipient of the electronic message, wherein the user identifier indicates an action allowed to be performed by the recipient; and one or more processors executing instructions stored on memory to:

transform the first location indicator into a second location indicator of the network resource, store the first location indicator in a network accessible storage, perform a security check on the first location indicator to confirm the first location indicator is not malicious, wherein the security check is performed by analyzing a reputation of the first location indicator;

confirm the recipient can access the network resource; and direct the recipient to the network resource via the first location indicator to allow the recipient to automatically access the network resource and perform the allowed action upon providing an input with respect to the second location indicator, wherein the second location indicator is configured to be non-resolving at a client device and does not identify the network resource, and wherein providing the input with respect to the second location indicator causes a server to retrieve the first location indicator from the network accessible storage location based on the second location indicator, re-perform the security check and confirm the allowed action for the recipient, and enable redirection to the network resource and execution of the allowed action only after successful server side validation.

11. The system of claim 10 wherein the one or more processors are further configured to whether the first length is greater than a threshold length, wherein the first location indicator is transformed based on determining that the first length is greater than the threshold length.

12. The system of claim 11, wherein the threshold length is based on capabilities of an electronic messaging service.

13. The system of claim 10 wherein the one or more processors specify the threshold length using a feature flag.

14. The system of claim 10 wherein the second location indicator includes at least one of a domain name, a queue identifier, and a user identifier.

15. The system of claim 10 wherein the one or more processors are further configured to associate the first location indicator and the second location indicator with a shared token value.

16. The system of claim 10 wherein the latency associated directing the recipient to the network resource is on the order of microseconds.

17. A computer program product for processing an electronic communication, the computer program product comprising computer executable code embodied in one or more non-transitory computer readable media that, when executing on one or more processors, performs the steps of:

receiving an electronic message including a first location indicator of a network resource, wherein the first location indicator has a first length and includes a user identifier of a recipient of the electronic message, wherein the user identifier indicates an action allowed to be performed by the recipient;

transforming the first location indicator into a second location indicator of the network resource;

storing the first location indicator in a network accessible storage location;

performing a security check on the first location indicator to confirm the first location indicator is not malicious, wherein the security check is performed by analyzing a reputation of the first location indicator;

confirming the recipient can access the network resource; and directing the recipient to the network resource via the first location indicator to allow the recipient to automatically access the network resource and perform the allowed action upon providing an input with respect to the second location indicator, wherein the second location indicator is configured to be non-resolving at a client device and does not identify the network resource, and wherein providing the input with respect to the second location indicator causes a server to retrieve the first location indicator from the network accessible storage location based on the second location indicator, re-perform the security check and confirm the allowed action for the recipient, and enable redirection to the network resource and execution of the allowed action only after successful server side validation.

18. The computer program product of claim 17 wherein the computer program product further comprises computer executable code that, when executing on one or more processors, performs the step of determining whether the first length is greater than a threshold, length wherein the first location indicator is transformed based on determining that the first length is greater than the threshold length.

19. The computer program product of claim 17 wherein the latency associated directing the recipient to the network resource is on the order of microseconds.

* * * * *